United States Patent
Mehta et al.

(10) Patent No.: US 10,754,971 B2
(45) Date of Patent: Aug. 25, 2020

(54) REFERENCED ACCESS CONTROL LIST

(71) Applicant: Google LLC, Mountain View, CA (US)

(72) Inventors: Vaibhav Mehta, Bangalore (IN);
Abhinav Khandelwal, Bangalore (IN)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 15/493,841

(22) Filed: Apr. 21, 2017

(65) Prior Publication Data
US 2018/0307853 A1    Oct. 25, 2018

(51) Int. Cl.
| | | |
|---|---|---|
| G06F 21/62 | (2013.01) | |
| G06F 16/185 | (2019.01) | |
| G06F 21/60 | (2013.01) | |
| H04L 29/06 | (2006.01) | |
| G06F 16/901 | (2019.01) | |
| G06F 16/23 | (2019.01) | |

(52) U.S. Cl.
CPC ........ *G06F 21/6218* (2013.01); *G06F 16/185* (2019.01); *G06F 16/9027* (2019.01); *G06F 21/604* (2013.01); *H04L 63/101* (2013.01); *G06F 16/23* (2019.01); *G06F 2221/2145* (2013.01)

(58) Field of Classification Search
CPC ............... G06F 21/6218; G06F 21/604; G06F 17/30961; G06F 17/30221; G06F 2221/2141; G06F 2221/2145; G06F 17/30345; H04L 63/101
See application file for complete search history.

(56) References Cited

U.S. PATENT DOCUMENTS

| | | |
|---|---|---|
| 5,960,446 A | 9/1999 | Schmuck et al. |
| 6,438,549 B1 | 8/2002 | Aldred et al. |
| 6,647,388 B2 | 11/2003 | Numao et al. |
| 6,823,338 B1 * | 11/2004 | Byrne ................. G06F 21/6227 |
| 7,739,316 B2 * | 6/2010 | Thompson ............ G06F 16/284 707/825 |

(Continued)

OTHER PUBLICATIONS

International Search Report and Written Opinion issued in International Application No. PCT/US2018/015230, dated Apr. 13, 2018, 14 pages.

(Continued)

*Primary Examiner* — Belix M Ortiz Ditren
*Assistant Examiner* — Aryan D Toughiry
(74) *Attorney, Agent, or Firm* — Fish & Richardson P.C.

(57) ABSTRACT

Methods, systems, and apparatus, including computer programs encoded on a computer storage medium, for referenced access control lists. In one aspect, a method includes accessing an object hierarchy for a plurality of objects, each object being representative of one of a storage location or a file. The object hierarchy includes for each object, a respective node, for each object that is a parent object having a child object, a directed edge connecting the node representing the parent object. In addition, for each object, including metadata that includes an access control list identifier that identifies an access control list for the object and that is owned by an access control list root object. The method including receiving updates to an access control list for particular objects, generating a new access control list, and storing the new access control list identifier in metadata for each object that descends from the particular object.

18 Claims, 6 Drawing Sheets

(56) References Cited

U.S. PATENT DOCUMENTS

| | | | |
|---|---|---|---|
| 2007/0100830 A1* | 5/2007 | Beedubail | ............... G06F 16/23 |
| 2008/0155652 A1 | 6/2008 | DeBie | |
| 2008/0163207 A1 | 7/2008 | Reumann | |
| 2011/0173679 A1 | 7/2011 | Reumal et al. | |
| 2018/0091583 A1* | 3/2018 | Collins | ............... H04L 41/5003 |
| 2018/0278548 A1* | 9/2018 | Pignataro | ............... H04L 69/22 |

OTHER PUBLICATIONS

'www.ibm.com' [online] "ICMST AccessCodes (Access Control List Code Table) Version 8.5.0," Last Update Date: Unknown, [retrieved Apr. 19, 2017] Retrieved from Internet: URL<https://www.ibm.com/support/knowledgecenter/SSRS7Z_8.5.0/com.ibm.systemtables.doc/icmstaccesscodes.htm> 2 pages.

* cited by examiner

REFERENCED ACCESS CONTROL LIST

BACKGROUND

Many storage systems regulate access to stored content by access control lists. Access control lists provide storage systems a mechanism for controlling access to content stored in the database. For example, in an object hierarchy, for example a tree of interconnected files and folders, each object within the hierarchy (e.g., each folder, file, etc.) has its own access control list stored with the particular object. Each access control lists for each object may be stored within object metadata for each object, or may be stored within the object itself.

In such an object hierarchy, a child object usually inherits the access control list of a parent object. Thus, any change to an access control list would require a change to each descendent access control list for each descendent object in the object hierarchy. Moreover, when a particular child object access control list is changed, the access control lists for its descendent objections must be changed, but the access control lists for its ascendant objection need not be changed.

SUMMARY

This specification describes technologies relating to managing access control lists.

In general, one innovative aspect of the subject matter described in this specification can be embodied in methods that include the actions of accessing an object hierarchy for a plurality of objects, each object being representative of one of a storage location or a file, and each storage location may store one or more subordinate storage locations or files. The hierarchy includes for each object, a respective node. The hierarchy includes for each object that is a parent object having a child object, a directed edge connecting the node representing the parent object to the node representing the child object, where at least one object is represented by a root object, and at least one object is represented by a leaf object. The hierarchy includes for each object that is not an access control list root object, where an access control list root object is an object for which an access control list is owned by the object, including metadata that includes an access control list identifier that identifies an access control list for the object and that is owned by an access control list root object. The hierarchy includes for each object that is not an access control list root object, receiving updates to an access control list for particular objects, and determining, for each update, whether the particular object is an access control list root object. The hierarchy includes for each update for a particular object determined to be an access control list root object, updating the accesses control list owned by the access control list root object. The hierarchy includes for each update for a particular object not determined to be an access control list root object generating a new access control list based on the update and the access control list referenced by the access control list identifier for the node and setting ownership of the new access control list to the particular object to cause the particular object to become an access control list root object. The hierarchy includes for each update for a particular object not determined to be an access control list root object generating a new access control list identifier that identifies the new access control list and storing the new access control list identifier in metadata for each object that descends from the particular object and that inherits the access control list from the particular object. Other embodiments of this aspect include corresponding systems, apparatus, and computer programs, configured to perform the actions of the methods, encoded on computer storage devices.

In systems that maintain separate access control lists for each object, changing a large number of access control lists may require a long completion time due to the number of access control lists that are modified and the latency due to change propagation in the hierarchy. This can cause temporary access control list errors in which a particular person may have access to a particular object after the access has been revoked, or in which a particular person may not have access to a particular object after access has been granted. In addition, storing an access control list for every document, folder, etc., can use a relatively large amount of resources (e.g., storage locations, memory, etc.) when compared to the amount of resources required by systems that implement the features described below.

Particular embodiments of the subject matter described in this specification can be implemented so as to realize one or more of the following advantages. Storing an access control list identifier (ID) with the object metadata reduces the amount of storage and memory required to manage access control lists for a large data set arranged according to a hierarchical structure. In addition, storing an access control list ID with each object reduces the completion time when modifying access control lists relative to the completion time required for modifying a separate access control list for each object. This is because, in some instances, one access control list can be modified and the change is reflected for many objects within the object hierarchy are subject to the access control list. In addition, modifying only one access control list for many objects reduces the amount of time for the modifications to take effect because propagation latencies are reduced or even eliminated. Since access control list modifications are implemented faster than in systems that have a separate access control list for each object, access checks for entities occur more quickly because the access control list modifications do not have to propagate to each object access control list in the hierarchy. Furthermore, the size of object hierarchies can be significantly increased compared to the size of standard object hierarchies. This is because modifications to access control lists propagate more quickly through the object hierarchy reducing potential large propagation latencies due to the size of the large object hierarchy. These result in technical improvements in the technological field of storage systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
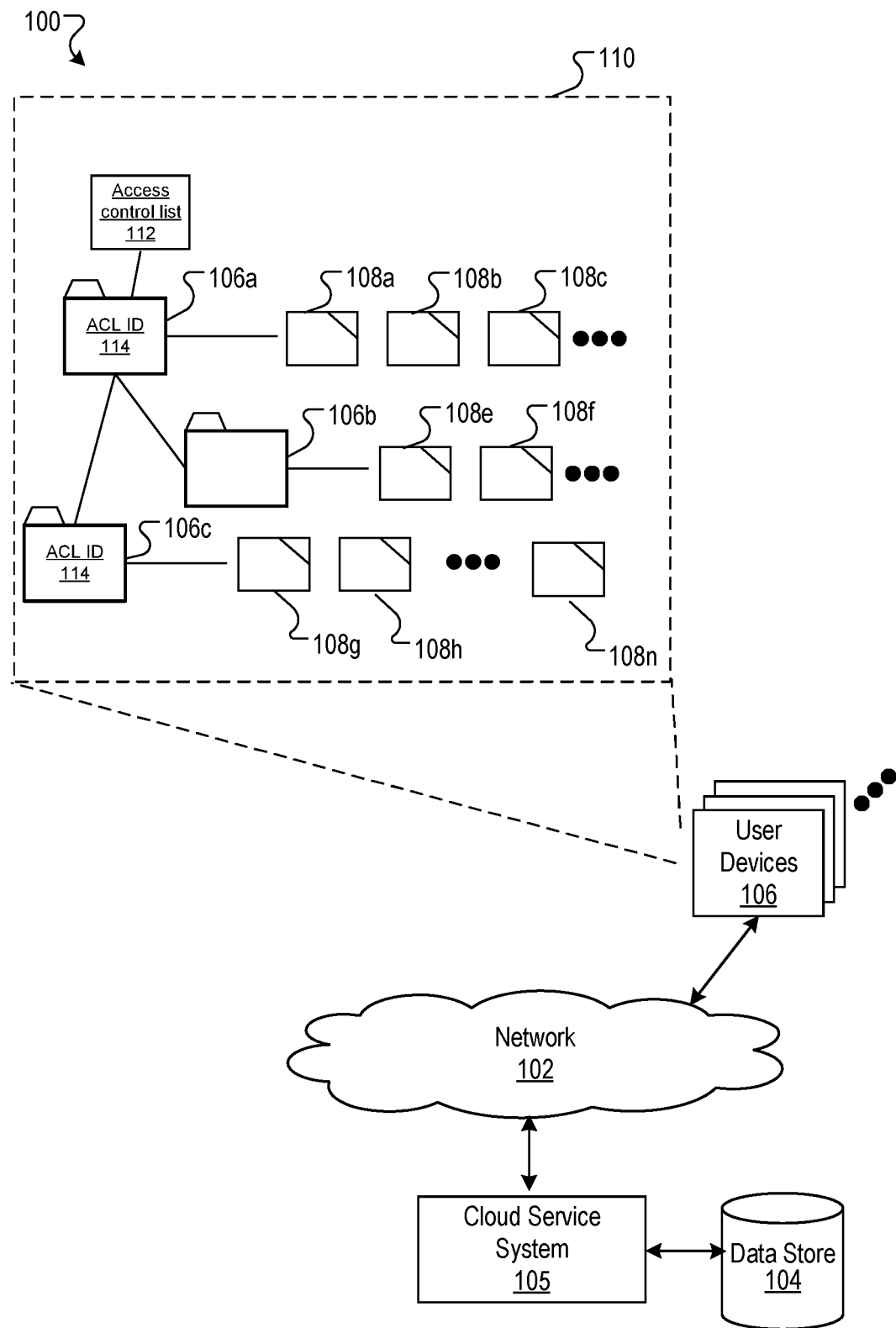
FIG. 1 is a block diagram of an example environment in which an access list hierarchy is integrated into a storage management system.

The systems and methods described herein relate to managing access control lists for an object hierarchy. Access control lists can determine which user has read, write, and/or create access to various objects. Objects (e.g., folders, files, etc.) can be stored in a hierarchal configuration with parent objects and children objects. The child objects descend from and are linked to respective parent objects. An access control list for a parent object can define access privileges for the parent object as well as for child objects that descend from the parent object (a "child" object may descend from a parent object either directly or indirectly through one or more intermediate child objects). In this instance, the access control list is stored for the parent object and an access control list identifier that references the access control list stored for the parent object is stored for child object.

A change request to access privileges for the parent object causes the parent access control list to be updated to reflect the change. In the case in which the child objects have the same access privileges as the parent object, the change is also reflected in the access privileges of the child objects. This occurs because of the access control list identifiers that is stored for the child objects reference the parent object's access control list. However, only a change to one access control list occurs—the change to the parent object access control list. After the parent object access control list is changed, the change is reflected for the child objects linked to the parent object without having to change the access control list for each individual child object.

There are situations in which a child object can also have access privileges different from its parent object. In these situations, the child object has a different access control list from the parent object, and the different access control list is stored with the child object. If a particular child object is itself a parent object of child objects that descend from it, then those child objects have the access control list identifier of the access control list of the particular child object from which they descend.

When a child object access control list diverges from its parent object access control list, or when a child object has two more parent objects, updating and modifying access control lists may be subject to an asynchronous task process. During the asynchronous task process, updates are managed in a matter that ensures proper conflict resolution of access control lists of affected child nodes.

These features and additional features are described in more detail below. The systems and methods described below are illustrated in the context of a cloud-based service system. However, the systems and methods are applicable to any computer system that manages a hierarchal storage system subject to access control lists and that provide simultaneous access to multiple users. Thus, while illustrated in the context of a cloud based system, the systems and methods may also be implemented on a single computing device, such as a single server computer.

Example Access Control List Hierarchy

FIG. 1 is a block diagram of an example environment 100 in which an access list hierarchy is integrated into a storage management system. A computer network 102, such as a local area network (LAN), the Internet, or a combination thereof, connects a data store 104, a cloud service system 105, and user devices 106. The user devices 106 can access a plurality of objects 110 stored within the data store 104. For example, if the cloud service system 105 is a document creating, editing and storage system, the objects in the data store may include documents and hierarchical storage locations, such as sets of nested folders in which the documents are stored.

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

The data store 104 can be any type of data storage including servers and large-scale data disk storage, or any other storage mechanism of the like. The data store 104 includes a plurality of objects 110. An "object" is any identifiable stored data entity that users may have access to and that can be represented by a node in a graph hierarchy. Objects include folders, files, feeds, streaming data, etc. The objects 110 are stored according to a hierarchy. For example, the plurality of objects 110 include folders 106a-106c. The objects 106a-106c are arranged in a hierarchy, where object 106a is parent object having five direct child objects—two directory child objects 106b and 106c and three file objects 108a-108c. Each object 106a-c contains a set of files 108 stored in each respective object. For example, the directory object 106a has file objects 108a-108c stored within it; directory object 106b has file objects 108e-f stored in it, and folder object 106c has file objects 108g-n stored within in it.

The directory object 106a has an access control list 112 that is stored with object metadata for the directory object 106a. The access control list 112 specifies access permission which define actions (read, write, store, create, etc.) each user of a particular set of users (e.g., persons, a group of people by titles, a group of people by positions, etc.) can perform on the object 106a. As shown in FIG. 1, the state of the objects 110 in the hierarchy is such that the objects 106b-c and 108a-108n inherit the access control list of the directory object 106A. Thus, an identifier (ACL ID) 114 that identifies the access control list 112 is stored with each child object's metadata. Thus, in the initial state of FIG. 1, users that have specified access permissions for the directory object 106a have the same access permissions applied to the objects 106b-106c and 108a-108c.

The access control list 112 can be modified to change access permissions for one or more users that currently have access permissions for the object 106a (modify permissions of existing users or delete existing users from the access control list) or provide users that do not have access permissions for the object 106a with access permissions (add users to the ACL). Accordingly, if the access control list 112 is modified for the object 106a, the modifications propagate to all other descendent objects of the parent object 106a.

Additional details regarding modification of access control list and modification propagation will be discussed in connection with FIGS. 2A-D.

Figure 2A:
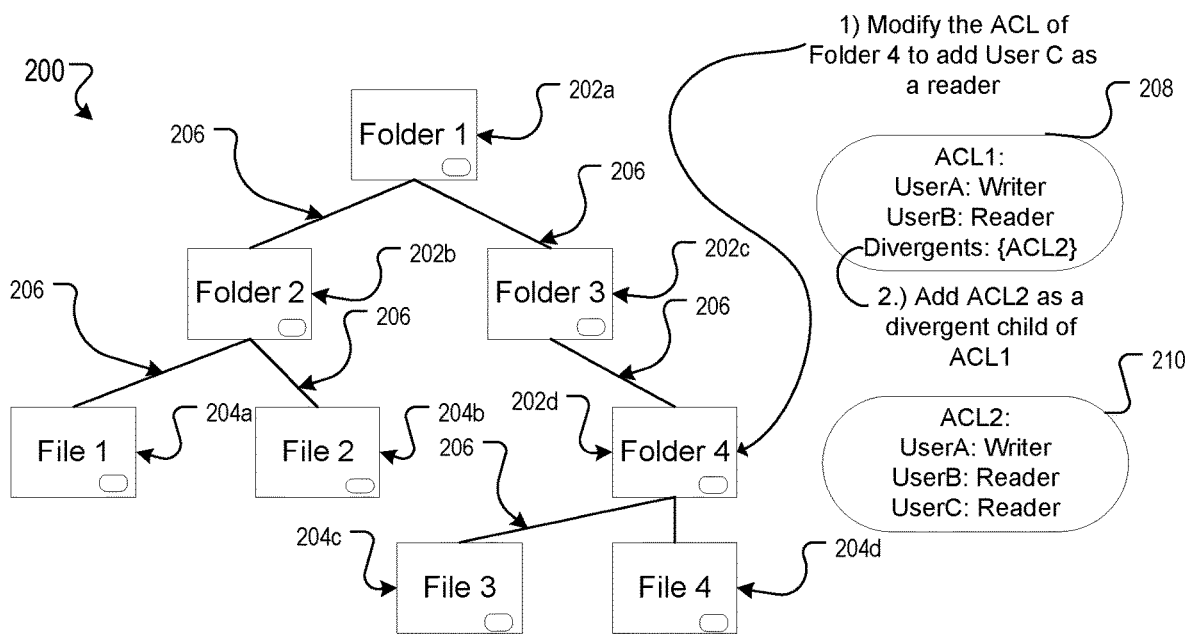
FIGS. 2A-D are block diagrams illustrating example access control list permission modifications.

A new object can be created within the object hierarchy. For each new object that has only one parent object, the new object is assigned the access control list identifier of the parent object. However, for each new object that two or more parent objects, a new access control list is created for the new object. The new access control list aggregates the access controls of the access control lists that govern the respective parent objects, subject to conflict resolutions. In addition, an access control list identifier is created that is specific to the new object, and new child object of the new object have the access control list identifier stored in their respective metadata FIGS. 2A-D are block diagrams illustrating example access control list permission modifications. An object hierarchy 200 includes hierarchal related objects (i.e., folders and files) 202a-d and 204a-d. FIG. 3 is a flow diagram of an example process 300 for managing access control lists, and the process 300 is described in conjunction with the description of FIGS. 2A-D.

The process 300 accesses an object hierarchy 200 for a plurality of objects (302). Each folder object 202a-d and file object 204a-d are representative of one of a storage location or a file. Folder objects 202a-d are each define a particular storage location within the database 104. In addition, each file object 202 may store one or more subordinate folder objects or file objects. For example, file objects 204a-b are stored within folder object 202b and file objects 204c-d are stored within folder object 202d.

The object hierarchy 200 includes, for each object, a respective node. The node can be physical and/or a symbolic representation of the object. For each object that is a parent object having a child object, a directed edge 206 connects the node representing the parent object to the node representing the child object. The directed edge 206 defines a relationship between the nodes, directed from the parent object node to the child object node.

A parent node is a node that is higher in the order of the object hierarchy respective to a node that descends from the parent node. Accordingly, the child node is lower than the parent node in the order of the hierarchy. For example, folder object 202a is represented by a parent node to nodes representing objects 202b-202d and 204a-204d, as each of the latter objects descend directly or indirectly from the object 202a. However, folder object 202c is a parent node to only the nodes representing objects 202d, 204c and 204d. A child node inherits access control list permissions from its parent node. Details regarding how the child node inherits the access control list permissions from the parent node will be described later in connection with access control list identifiers.

In an object hierarchy, at least one object is a root object represented by a root node, and at least one object is a leaf object represented by a leaf node. A root node is a parent node that is not a child node of any other parent nodes. For example, folder object 202a is a root node because it does not have a parent node. A leaf object is an object that is a child node and has no descendants, such as filed objects 204a-204d. Leaf objects are represented by leaf nodes.

With respect to access control lists, an object may be an access control list root object. However, an access control list root object need not be a root object in the object hierarchy 200. In particular, an access control list root object is an object for which an access control list is owned by the object. An access control list root object "owns" an access control list when it no longer references an access control list of a parent object, and instead references its own access control list. For example, assume during an initial state that folder object 202a has an access control list set for it— access control list 208, which defines User A as having write access, and User B as having read access. During this initial state, the "Divergent" field of the access control list 208 is blank. Use of the divergent field is described in more detail below.

All other objects 202b-202d and 204a-204d are subject to the access control list of the folder object 202a. In this case, the folder object 202a is the only access control list root object in the hierarchy. However, assume at a later time access to folder object 202d for a particular user specified in the access control list for the folder object 202a is deleted. As will be explained below, this will cause the creation of an new access control list that is owned by the folder 202d. Accordingly, the folder object 202d becomes an access control list root object, and the filed objects 204c and 204d have their respective access control list identifiers updated to reference the access control list for the folder object 202d. This would result in two access control list root objects in the hierarchy—folder object 202a and folder object 202d.

Each object that is not an access control list root object is thus an object that references an access control list of an ascendant object. Such referencing can be accomplished by metadata that has an access control list identifier that identifies an access control list that is owned by an access control list root object. As previously described, for example, during the initial state of the hierarchy 200, folder objects 202b-202d and file objects 204a-202d are each inherit the access control list of the folder object 202a by virtue of their respective access control list identifiers referencing the access control list of the folder object 202a. Accordingly, the folder objects 202b-202d and file objects 204a-204d are not access control list root objects.

The process 300 receive an update to an access control list for a particular object (304). Updates for an access control list modify access control permissions for a particular object. For example, updates for a particular object access control list may include designating read and write access to either one of a storage location or a file for a user, or removing read and write access for the user.

The process 300 determines whether the particular root object is an access control list root object (306). The determination can be made, for example, by determining whether the object is an owner of an access control list, such as by accessing a data field that indicates whether the object is an owner of an access control list. If the particular object is an owner, then it is an access control list root object; otherwise, it is not.

For each update for a particular object determined to be an access control list root object, the access control list owned by the access control list root object is updated (308). Child nodes that inherit the access control list of the access control list root object, however, do not need to be updated as their respective access control list identifiers reference the access control list of the access control list root object. Thus, updating the access control list for an access control list root object immediately updates access permissions for child objects in the object hierarchy that have the access control list identifier for the updated root access control list stored in their object metadata. Accordingly, one update operation modifies access permissions for multiple objects without having to update an access control list for each affected object.

For each update for a particular object determined to be an access control list root object, the process 300 generates a new access control list based on the update and the access control list referenced by the access control list identifier for the node (310). The process 300 then sets the ownership of the new access control list to the particular object to cause the particular object to become an access control list root object (312).

Referring back to FIG. 2A, assume an instruction is sent to modify the access control list of folder object 202*d* to add a new user, User C, as a reader of content within folder object 202*d*. Folder object 202*d* is initially a non-root object because it references the access control list of the folder object 202*a* by means of an access control list identifier. Accordingly, a new access control list 210 is generated by process action 310. The new access control list 210 for the folder object 202*d* inherits the access permissions from its previously inherited access control list, i.e., access control list 208, and the process 300 applies the changes to the inherited access control list parameters to carry out the modification and generation the new access control list 210. As a result, User A remains identified as a writer and User B remains identified as a reader in access control list 201, and User C is added to the new access control list 210 as a reader.

The process 300 generates a new access control list identifier that identifies the new access control list 210 (314). The new access control list 210 is given the identifier "ACL2", as shown in FIG. 2A. Further, the process 300 stores the new access control list identifier in metadata for each object that descends from the particular object and that inherits the access control list from the particular object (216). For example, for each object that inherits the access control list 210 from the folder object 202*d*, i.e., objects 204*c* and 204*d*, metadata storing the access control list identifier of the new access control list 210 is stored. (314). Thus, files objects 204*c* and 204*d* store access control list identifier "ACL2" by replacing the previously stored access control list identifier, "ACL1" with "ACL2".

Divergent Fields and Divergent Objects

Over the course of time, the access control list hierarchy will have leaves with immediate children that are roots of other hierarchies with different access control lists, such as the end result of FIG. 2A. The system stores a list of divergent children node access control list identifiers in a list at each access control list root node having divergent child nodes. For example, in FIG. 2A, the access control list 208 stores the identifier of the access control list 210 in a divergent field, e.g., Divergents: {ACL2}. When updating an access control list at an access control list root node, the system creates an asynchronous task to propagate the access control list update to all the divergent access control lists identified by the divergent field of the access control list root node's access control list. In other words, in the example of FIG. 2A, for each update for which a particular object is not determined to be an access control list root object (e.g., the first update to the access control list for the folder object 202*d*, as described above), the new access control list identifier (e.g., ACL2 of FIG. 2A) is stored as a divergent object in the access control list (e.g., ACL1 of FIG. 2A) of the access control list root object (e.g., Folder object 202*a*) that the particular object descended from.

Figure 2B:
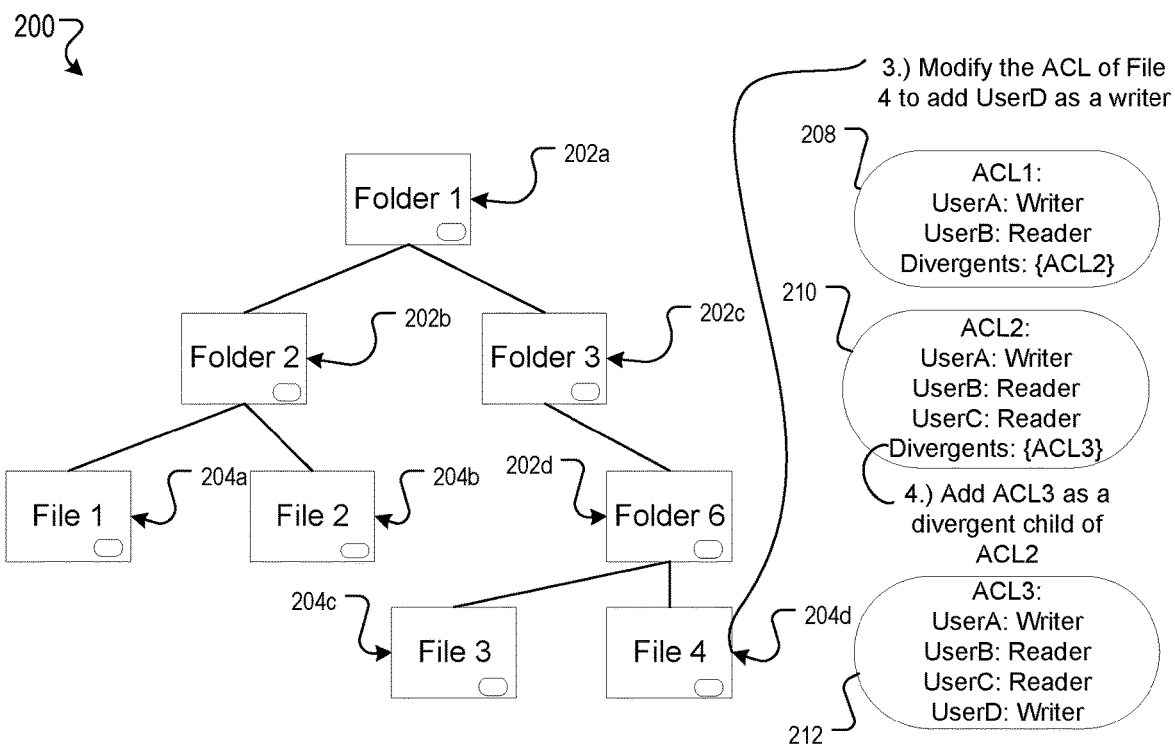
Figure 3:
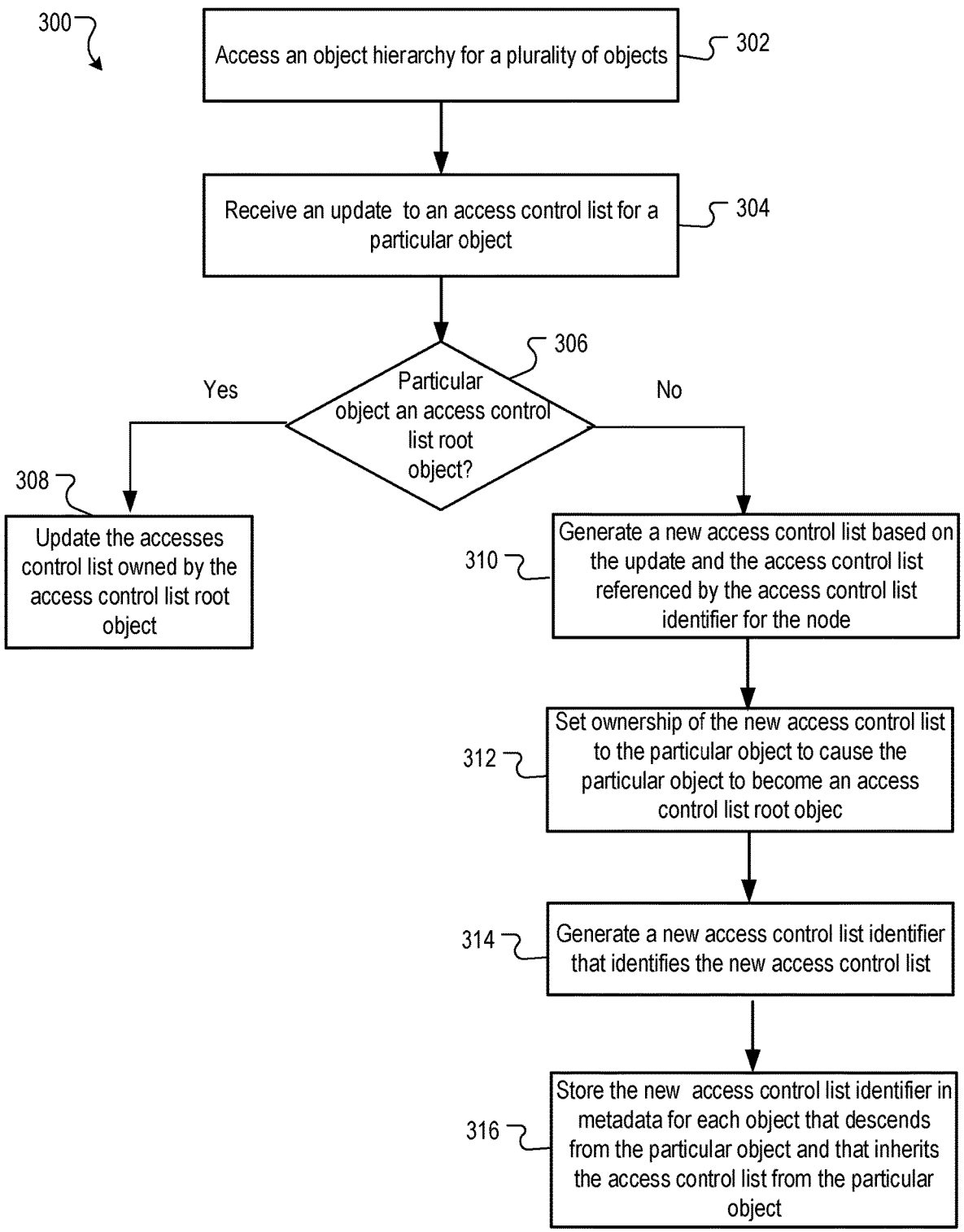
FIG. 3 is a flow diagram of an example process for managing access control lists.

FIG. 2B illustrates further example access control list permission modifications. An access control list owned by a root object is independent of any other access control list of any object that is a child of the root object. For example, folder object 202*d*'s access control list can be updated without having to update folder object 202*a*'s access control list. Assume that an instruction is sent to modify the access control list of file object 204*d* to add User D as a writer (3). A new access control list 212 is thus created for file object 204*d*. The new access control list 212 inherits the access control permissions of its owner's node's old access control list, e.g., access control list 210. Moreover, the new access control list 212 has User D added as a writer and a new unique access control list identifier "ACL 3" for the access control list is created. Folder object 204*d*'s access control list 210 also includes the access control list identifier "ACL 3" as a divergent object.

Figure 2C:
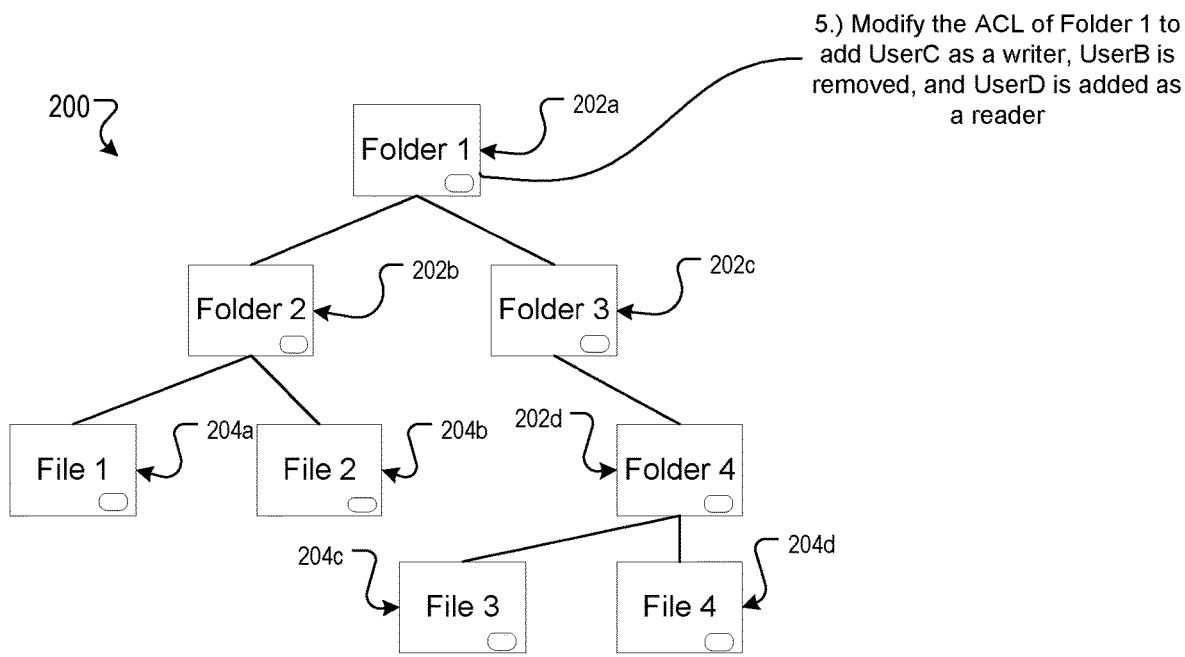
Figure 2D:
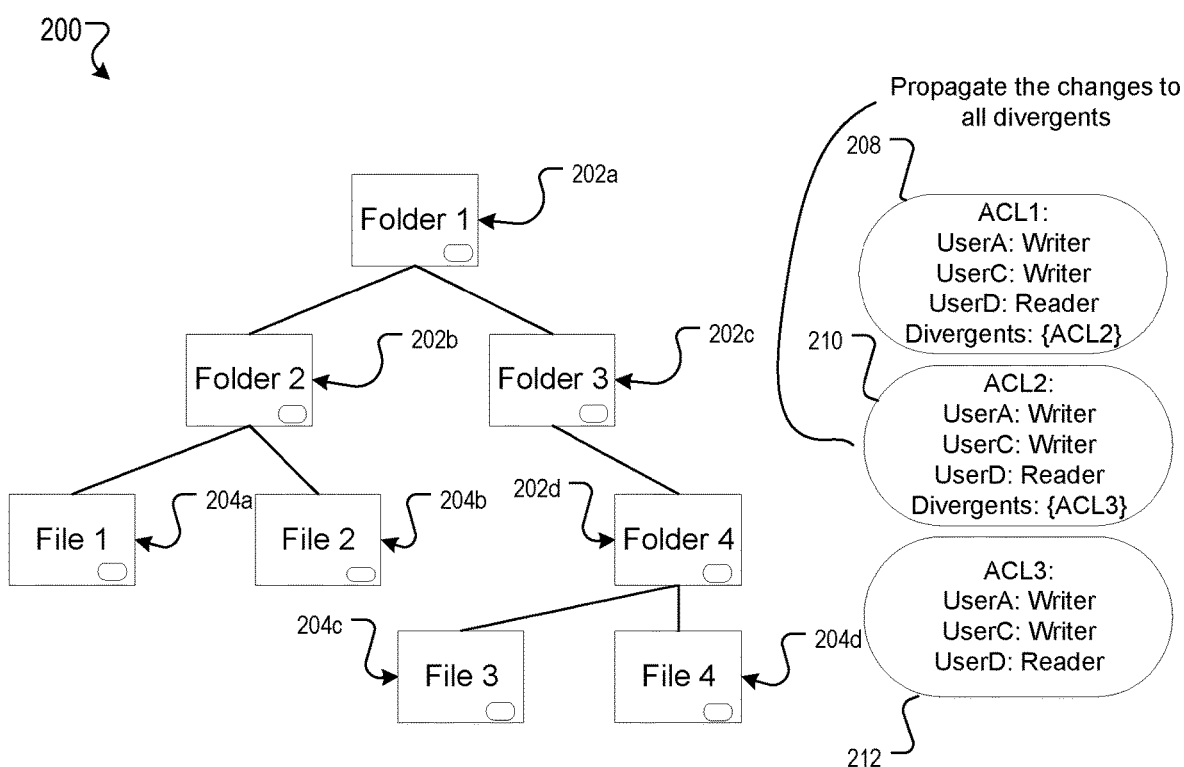

FIGS. 2C and 2D illustrate further instances of access control list permission modifications. While an access control list owned by a root object is independent of any other access control list of any object that is a child of the root object, the access control list owned by the root object is dependent of the access control lists of the nodes from which it descents. For example, in FIG. 2C the object hierarchy 200 receives an instruction to modify the access control list of folder object 202*a* to add User C as a writer, to remove User B, and to add User D as a reader. FIG. 2D illustrates the implementation of the instruction described in FIG. 2C and the propagation of the updates to divergent access control lists. Each of the access control lists 210 and 212 are modified in response to the change to the access control list 208.

Folder object 202*a*'s access control list 208 is updated by the system 105 to add User C as a writer, to remove User B, and to add User D as a reader. After the update is applied to the access control list 208, the access control list 210, identified by the divergent object in access control list 208, is selected. Divergent conditions in the access control list 208 are then propagated to the access control list 210. In other words, in access control list 201, User B will be removed, User C will be changed to Reader, and User D will be added as a Reader.

Likewise, once the access control list 210 is updated, the access control list 212, identified by the divergent object in access control list 210, is selected. Divergent conditions in the access control list 210 are then propagated to the access control list 212. In other words, in access control list 212, User B will be removed, User C will be changed to Writer, and User D will be changed to Reader.

Conflicting Updates

Figure 4A:
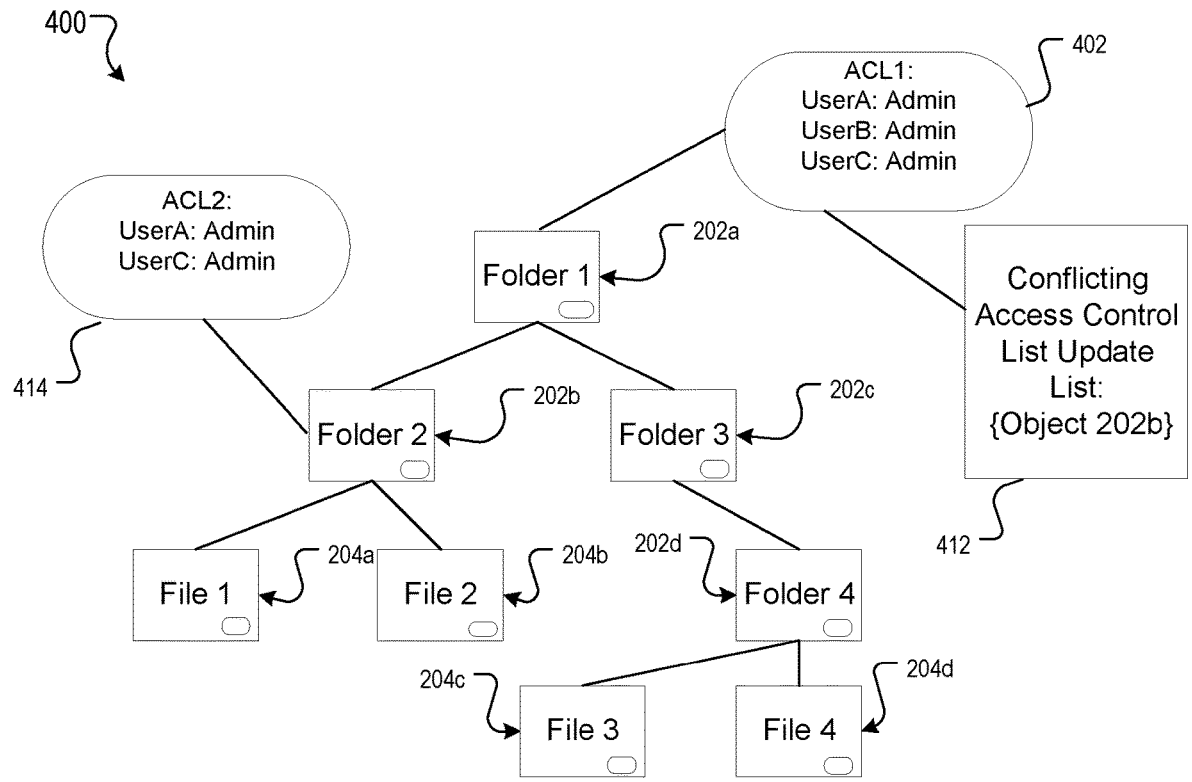
FIG. 4A is a block diagram illustrating an example object hierarchy.
Figure 4B:
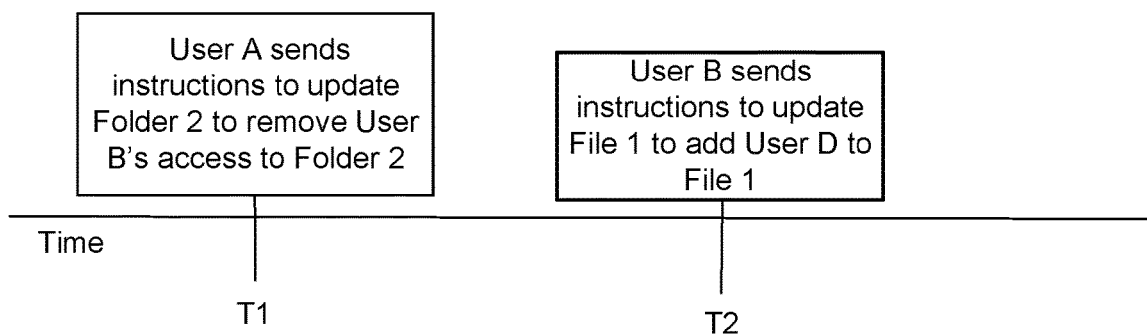
FIG. 4B is a timing diagram of access control list instructions provided to the object hierarchy of FIG. 4A.
Figure 5:
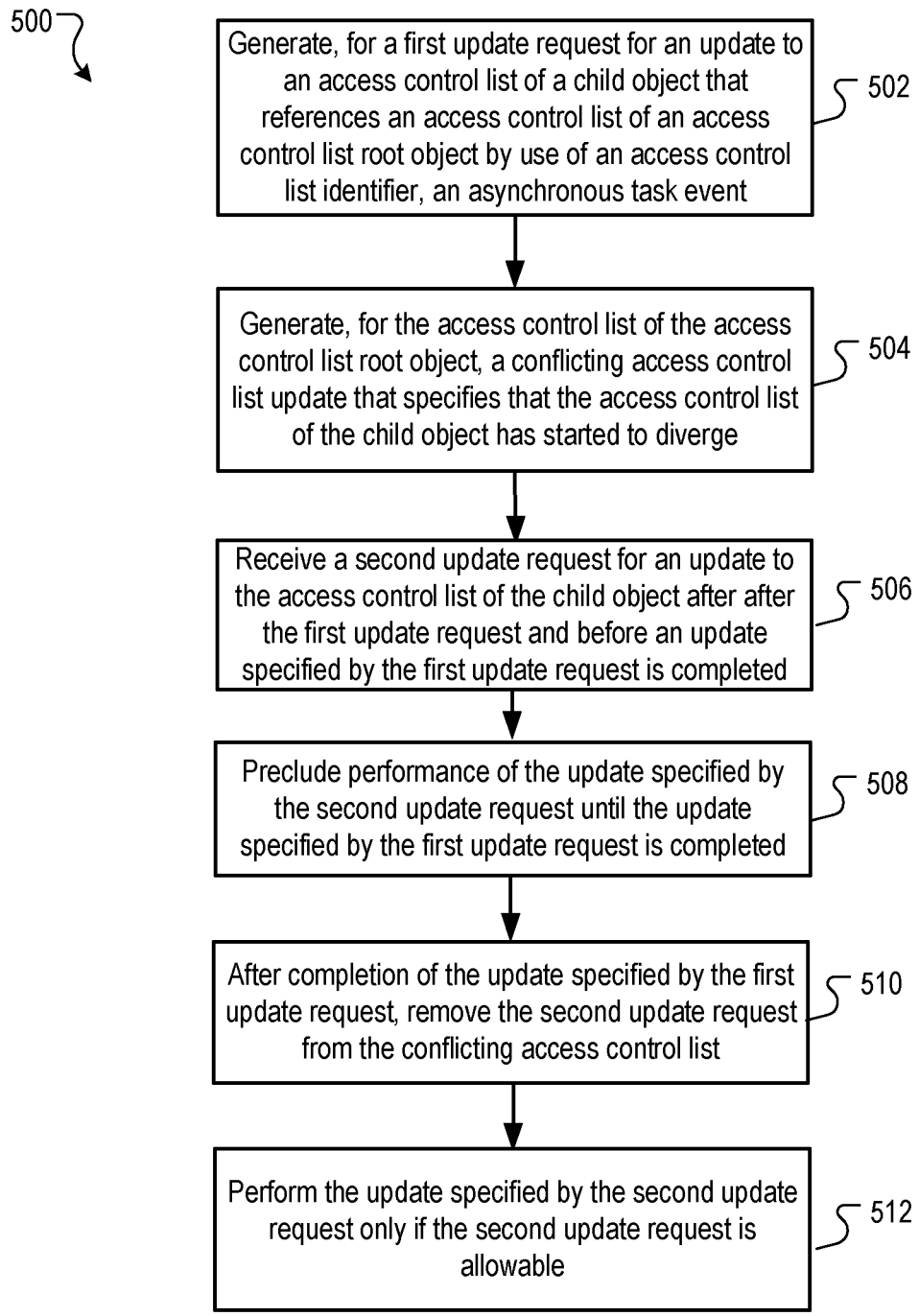
FIG. 5 is a flow diagram of an example process for managing conflicting object access control list updates.

There may be situations in which updates may conflict due to access control list update propagation delays. FIG. 4A is a block diagram illustrating an example object hierarchy 400 and conflicting access control list updates, and FIG. 4B is a timing diagram of access control lists instructions provided to the object hierarchy of FIG. 4A. FIG. 5 is a flow diagram of an example process 500 for managing conflicting object access control list updates. Aspects of FIG. 5 will be described in connection with FIGS. 4A and 4B.

Folder object 202*a* is an access control list root object that owns the access control list 402. The access control list 402 specifies that Users A, B, and C have admin permissions. Admin permissions enable a user to read, write, and dictate other user permissions. Folders objects 202*b-d* and files objects 204*a-d* each have access control list's 402 identifier "ACL1" stored with each individual folder object's and file object's metadata. Thus, at the start of the timing diagram of FIG. 4B, all folders and files in the object hierarchy 400 are using folder object 202*a*'s access control list 402 for user access permissions.

Referring to FIGS. 4A and 4B, at time T1 User A sends instructions to update folder object 202*b* to remove User B's access to folder object 202*b*. At time T2, which occurs after time T1, User B sends instructions to add User D as an admin to file object 204*a*. In this particular instance, User B's instructions are sent before the update specified by User A's instructions has finished executing. However, at time T1

User A sent instructions to remove User B from the access control list of folder object 202b. Thus, User D should not have access to folder object 202b or its subtree, because User B sent the instruction at time T2, after time T1. However, since the asynchronous task event sent at time T1 had not finished by time T2, the access control list identifier of folder object 202b still points to folder object 202a, thus temporarily giving User D access to folder object 202b and folder object 202b's descendants.

To avoid this conflicting condition in which User D is given access to folder object 202b and its descendants, at time T1, folder object's 202a access control list includes a conflicting access control list update list 412 to indicate that folder object 202b has started to diverge in the access control lists and the propagation is not yet complete. Only after the update to remove User B from having access to the folder object 202b is complete will the folder object 202b be removed from the conflicting access control list update list 412 of the access control list 402. Until the update is completed, any access control list lookup operation in the hierarchy will involve traversing the access control lists of all ancestor objects until the root object 202a is reached or an object that is an access control list root object is reached. This ensures that the second request to update the folder 202b will be subject to the conflicting access control list updates of the access control list 402.

Turning now to the process of FIG. 5, the process 500 generates, for a first update request for an update to an access control list of a child object that references an access control list of an access control list root object by use of an access control list identifier, an asynchronous task event (502). For example, at time T1, as described above, User A sends instructions to remove User B from the access control list of folder object 202b.

The process 500 generates, for the access control list of the access control list root object, a conflicting access control list update that specifies that the access control list of the child object has started to diverge (504). For example, as described above, folder object's 202a access control list is modified to include a conflicting access control list update list 412 to indicate that folder object 202b has started to diverge in the access control lists and the propagation is not yet complete.

The process 500 receives a second update request for an update to the access control list of the child object, wherein the second update request is received after the first update request and before an update specified by the first update request is completed (506). For example, as described above, at time T2, which occurs after time T1, User B sends instructions to add User D as an admin to file object 204a.

The process 500 precludes performance of the update specified by the second update request until the update specified by the first update request is completed (508). Referring back to the example above, because the second request is listed in the conflicting access control list update list, performance of the update specified by the second request is precluded until the update specified by the first request is completed.

The process 500, after completion of the update specified by the first update request, removes the second update request from the conflicting access control list (512). For example, after the update specified by the first request is completed, the second update request is removed from the conflicting access control list. The removal allows for evaluation of the second request to determine if the second request can be performed.

The process 500 performs the update specified by the second update request only if the second update request is allowable (512). For example, if the request is allowable given the new access control list of the child node, the update may be performed. Otherwise, the update is rejected. Referring again to the example above, the update for the second request will not be performed, because after the update for the first request is completed, User B no long has access to folder object 202, as indicated by the access control list 414 now owned by the folder object 202b.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    accessing an object hierarchy for a plurality of objects, each object being representative of one of a storage location or a file, wherein each storage location may store one or more subordinate storage locations or files, wherein the hierarchy comprises:
        for each object, a respective node;
        for each object that is a parent object having a child object, a directed edge connecting the node representing the parent object to the node representing the child object;
        wherein an access control list root object in the hierarchy is an object that is an owner of an access control list that is identified by an access control list identifier; and
        wherein a child object of the access control list root object is assigned the access control list identifier indicating that the child object uses the access control list owned by the access control list root object;
    receiving access control updates for different objects in the object hierarchy, including a first access control update for a first object that is the access control list root object for a first access control list, and a second access control update for a second object that is not the access control list root object for any access control list;
    in response to the receiving the first access control update:
        modifying the first access control list owned by the first object based on the first access control update, while maintaining assignment, to (i) the first object (ii) child objects of the first object, and (iii) the first access control list, of a same access control list identifier that was assigned to the first access control list prior to the first access control update; and
    in response to receiving the second access control update:
        generating a new access control list for the second object based on: (i) the second access control update received for the second object, and (ii) a particular access control list that is owned by a particular parent object of the second object and referenced by a particular access control list identifier assigned to the second object prior to receipt of the second access control update, the new access control list being different than the particular access control list referenced by the particular access control list identifier;
        designating the second object as the access control list root object for the new access control list;
        generating a new access control list identifier that identifies the new access control list; and
        updating, for one or more child objects of the second object, metadata indicating a change in access control list assignment from the particular access control list to the new access control list for the one or more child objects.

2. The method of claim 1, further comprising, for the second access control update:
    designating the second object as a divergent child node; and
    designating and storing the new access control list identifier as a divergent object in the particular access control list for the particular parent object that the second object descended from.

3. The method of claim 1, further comprising:
    in response to receiving the second access control update:
        generating an asynchronous task event that specifies particular operations included in the second access control update; and
        generating, for the particular access control list, a conflicting access control list update that specifies that the access control list of a child object of the particular parent object has started to diverge from the particular access control list;
    in response to receiving a third access control update for a subsequent update to the access control list of the child object, received after the second access control update and before the first access control update has completed, and based on the conflicting access control list update that specifies that the access control list of the child object has started to diverge, wherein the second object is a child of the first object:
        precluding performance of the third access control update until the first access control update is completed;
        after the first access control update is completed:
            removing the third access control update from the conflicting access control list;
            determining whether the third access control update is allowable; and
            performing an additional update based on the third access control update only if the third access control update is allowable.

4. The method of claim 3, wherein the third access control update is a request to remove an access capability of a user.

5. The method of claim 1, wherein one of the first access control update or the second access control update is an update designating read and write access to either one of a storage location or a file.

6. The method of claim 1, further comprising:
    receiving a request to generate a new object within the object hierarchy;
    for each new object that it is determined that the object will have only one parent object, assigning to the new object the access control list identifier of the parent object; and
    for each new object that it is determined that the object will have more than one parent object:
        creating specific access control list based on access control lists of the more than one parent object, and an access control list identifier specific to the specific access control list for the new object; and
        storing, at the node corresponding to the new object, the specific access control list and the access control list identifier specific to the specific access control list for the new object.

7. A system, comprising:
    data processing apparatus; and
    a non-transitory computer readable storage medium in data communication with the data processing apparatus and storing instructions executable by the data processing apparatus and upon such execution cause the data processing apparatus to perform operations comprising:

accessing an object hierarchy for a plurality of objects, each object being representative of one of a storage location or a file, wherein each storage location may store one or more subordinate storage locations or files, wherein the hierarchy comprises:

for each object, a respective node;
  for each object that is a parent object having a child object, a directed edge connecting the node representing the parent object to the node representing the child object;
  wherein an access control list root object in the hierarchy is an object that is an owner of an access control list that is identified by an access control list identifier; and
  wherein a child object of the access control list root object is assigned the access control list identifier indicating that the child object uses the access control list owned by the access control list root object;
  receiving access control updates for different objects in the object hierarchy, including a first access control update for a first object that is the access control list root object for a first access control list, and a second access control update for a second object that is not the access control list root object for any access control list;
  in response to the receiving the first access control update:
  modifying the first access control list owned by the first object based on the first access control update, while maintaining assignment, to (i) the first object (ii) child objects of the first object, and (iii) the first access control list, of a same access control list identifier that was assigned to the first access control list prior to the first access control update; and
  in response to receiving the second access control update:
  generating a new access control list for the second object based on: (i) the second access control update received for the second object, and (ii) a particular access control list that is owned by a particular parent object of the second object and referenced by a particular access control list identifier assigned to the second object prior to receipt of the second access control update, the new access control list being different than the particular access control list referenced by the particular access control list identifier;
  designating the second object as the access control list root object for the new access control list to the particular object;
  generating a new access control list identifier that identifies the new access control list; and
  updating, for one or more child objects of the second object, metadata indicating a change in access control list assignment from the particular access control list to the new access control list for the one or more child objects.

8. The system of claim 7, the operations further comprising, for the second access control update
  designating the second object as a divergent child node; and
  designating and storing the new access control list identifier as a divergent object in the particular access control list for the particular parent object that the second object descended from.

9. The system of claim 7, the operations further comprising:
  in response to receiving the second access control update:
  generating an asynchronous task event that specifies particular operations included in the second access control update; and generating, for the particular access control list, a conflicting access control list update that specifies that the access control list of a child object of the particular parent object has started to diverge from the particular access control list;
  in response to receiving a third access control update for a subsequent update to the access control list of the child object, received after the second access control update and before the first access control update has completed, and based on the conflicting access control list update that specifies that the access control list of the child object has started to diverge, wherein the second object is a child of the first object:
  precluding performance of the third access control update until the first access control update is completed;
  after the first access control update is completed:
    removing the third access control update from the conflicting access control list;
    determining whether the third access control update is allowable; and
    performing an additional update based on the third access control update only if the third access control update is allowable.

10. The system of claim 9, wherein the second third access control update is a request to remove an access capability of a user.

11. The system of claim 7, wherein one of the first access control update or the second access control update is an update designating read and write access to either one of a storage location or a file.

12. The system of claim 7, the operations further comprising:
  receiving a request to generate a new object within the object hierarchy;
  for each new object that it is determined that the object will have only one parent object, assigning to the new object the access control list identifier of the parent object; and
  for each new object that it is determined that the object will have more than one parent object:
    creating specific access control list based on access control lists of the more than one parent object, and an access control list identifier specific to the specific access control list for the new object; and
    storing, at the node corresponding to the new object, the specific access control list and the access control list identifier specific to the specific access control list for the new object.

13. A non-transitory computer readable storage medium storing instructions executable by a user device and upon such execution cause the user device to perform operations comprising:
  accessing an object hierarchy for a plurality of objects, each object being representative of one of a storage location or a file, wherein each storage location may store one or more subordinate storage locations or files, wherein the hierarchy comprises:
  for each object, a respective node;
  for each object that is a parent object having a child object, a directed edge connecting the node representing the parent object to the node representing the child object;
  wherein an access control list root object in the hierarchy is an object that is an owner of an access control list that is identified by an access control list identifier; and wherein a child object of the access control list root object is assigned the access control list identifier indicating that the child object uses the access control list owned by the access control list root object;

receiving access control updates for different objects in the object hierarchy, including a first access control update for a first object that is the access control list root object for a first access control list, and a second access control update for a second object that is not the access control list root object for any access control list;

in response to the receiving the first access control update:
  modifying the first access control list owned by the first object based on the first access control update, while maintaining assignment, to (i) the first object (ii) child objects of the first object, and (iii) the first access control list, of a same access control list identifier that was assigned to the first access control list prior to the first access control update; and in response to receiving the second access control update:
  generating a new access control list for the second object based on: (i) the second access control update received for the second object, and (ii) a particular access control list that is owned by a particular parent object of the second object and referenced by a particular access control list identifier assigned to the second object prior to receipt of the second access control update, the new access control list being different than the particular access control list referenced by the particular access control list identifier;
  designating the second object as the access control list root object for the new access control list;
  generating a new access control list identifier that identifies the new access control list; and
  updating, for one or more child objects of the second object, metadata indicating a change in access control list assignment from the particular access control list to the new access control list for the one or more child objects.

14. The non-transitory computer readable storage medium of claim 13, the operations further comprising, for the second access control update:
  designating the second object as a divergent child node; and
  designating and storing the new access control list identifier as a divergent object in the particular access control list for the particular parent object that the second object descended from.

15. The non-transitory computer readable storage medium of claim 13, the operations further comprising:
  in response to receiving the second access control update:
    generating an asynchronous task event that specifies particular operations included in the second access control update; and
    generating, for the particular access control list, a conflicting access control list update that specifies that the access control list of a child object of the particular parent object has started to diverge from the particular access control list;
  in response to receiving a third access control update for a subsequent update to the access control list of the child object, received after the second access control update and before the first access control update has completed, and based on the conflicting access control list update that specifies that the access control list of the child object has started to diverge, wherein the second object is a child of the first object:
    precluding performance of the third access control update until the first access control update is completed;
    after the first access control update is completed:
      removing the third access control update from the conflicting access control list;
      determining whether the third access control update is allowable; and
      performing an additional update based on the third access control update only if the third access control update is allowable.

16. The non-transitory computer readable storage medium of claim 15, wherein the third access control update is a request to remove an access capability of a user.

17. The non-transitory computer readable storage medium of claim 15, wherein one of the first access control update or the second access control update is an update designating read and write access to either one of a storage location or a file.

18. The non-transitory computer readable storage medium of claim 15, the operations further comprising:
  receiving a request to generate a new object within the object hierarchy;
  for each new object that it is determined that the object will have only one parent object, assigning to the new object the access control list identifier of the parent object; and
  for each new object that it is determined that the object will have more than one parent object:
    creating specific access control list based on access control lists of the more than one parent object, and an access control list identifier specific to the specific access control list for the new object; and
    storing, at the node corresponding to the new object, the specific access control list and the access control list identifier specific to the specific access control list for the new object.

* * * * *

UNITED STATES PATENT AND TRADEMARK OFFICE
CERTIFICATE OF CORRECTION

PATENT NO.       : 10,754,971 B2
APPLICATION NO.  : 15/493841
DATED            : August 25, 2020
INVENTOR(S)      : Mehta et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*